Feb. 14, 1967        J. A. VARNEY ETAL        3,303,573
BINARY POSITION INDICATOR

Filed Aug. 23, 1963        4 Sheets-Sheet 1

INVENTORS
Robert L. Alder,
Justin A. Varney

Attorney

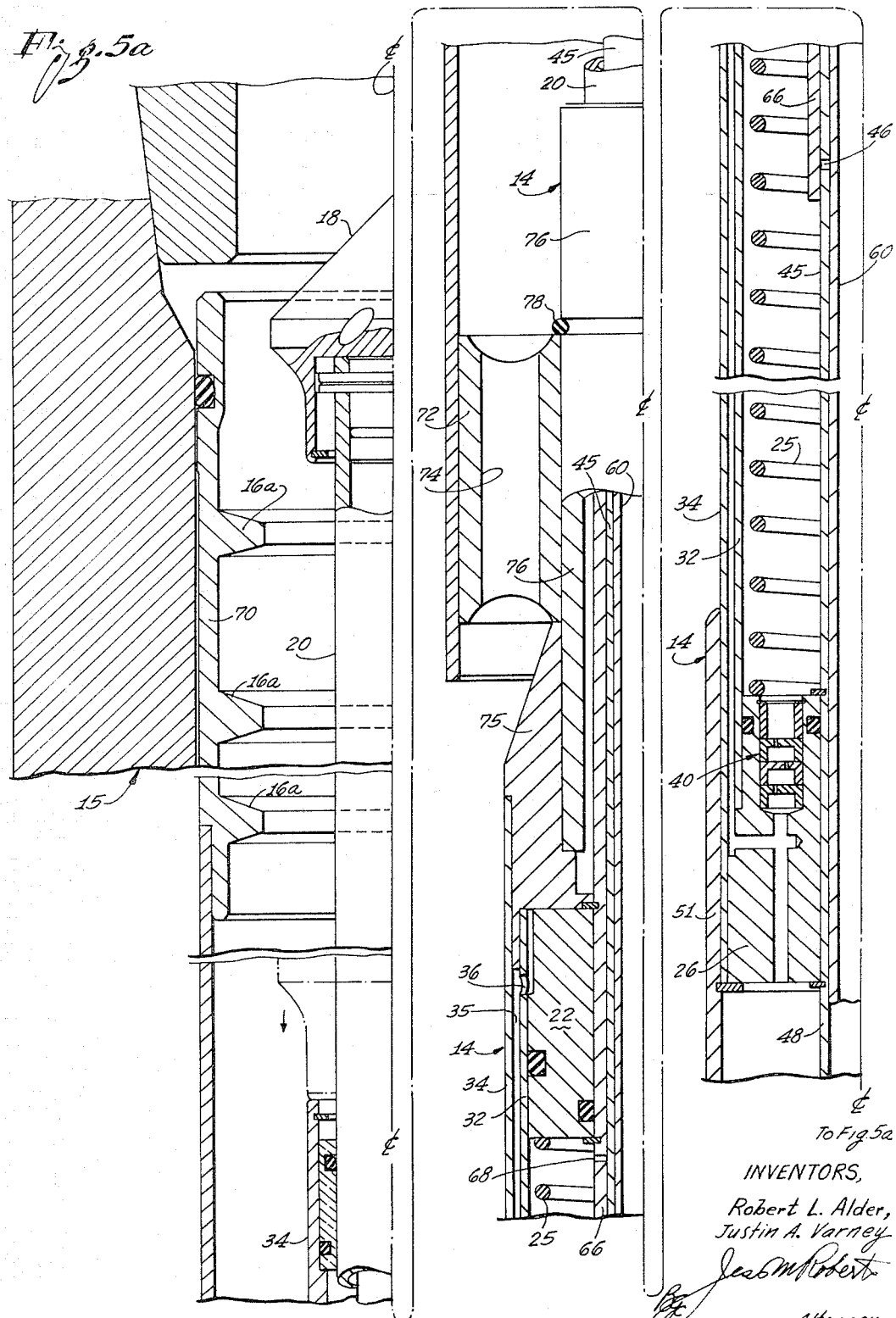

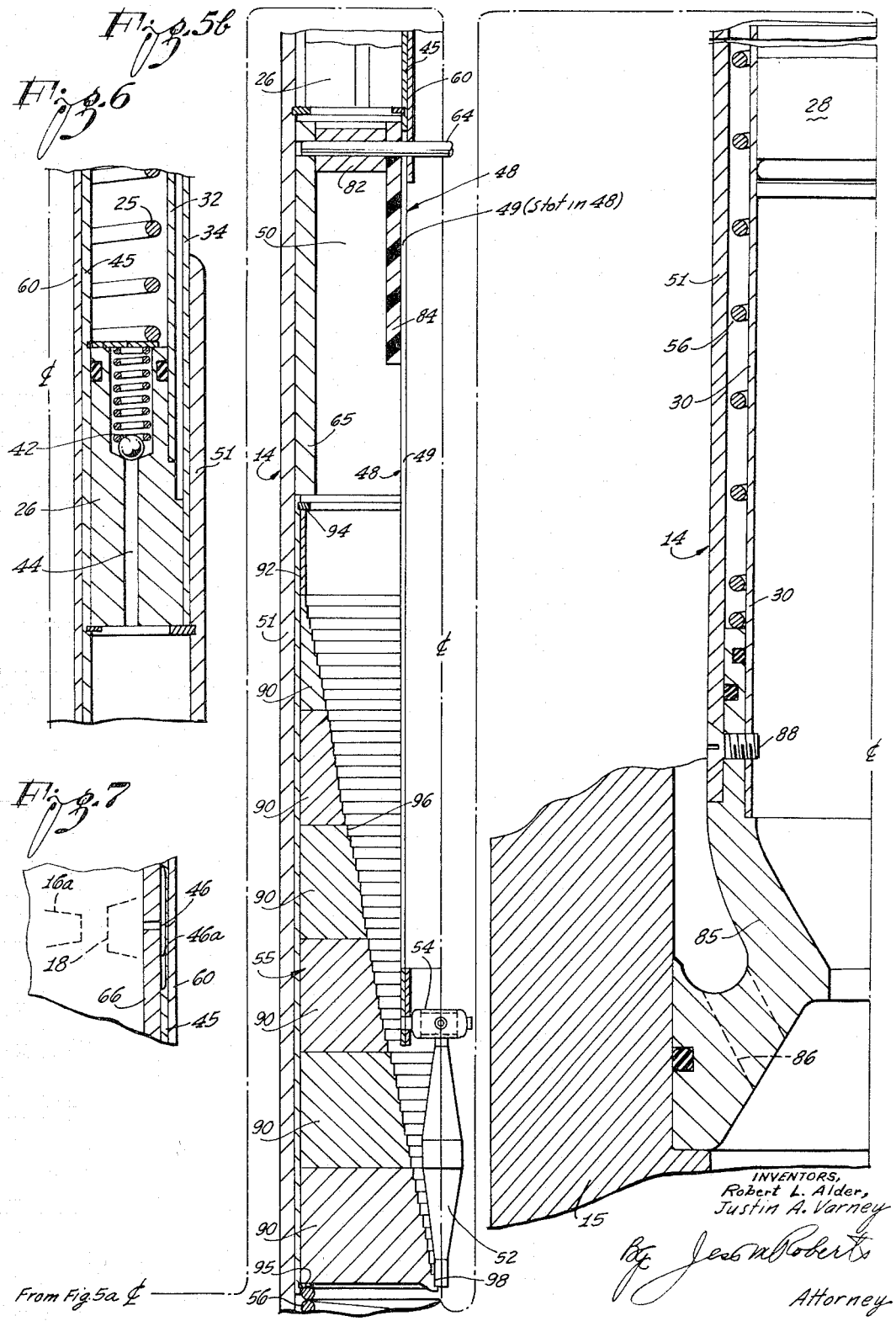

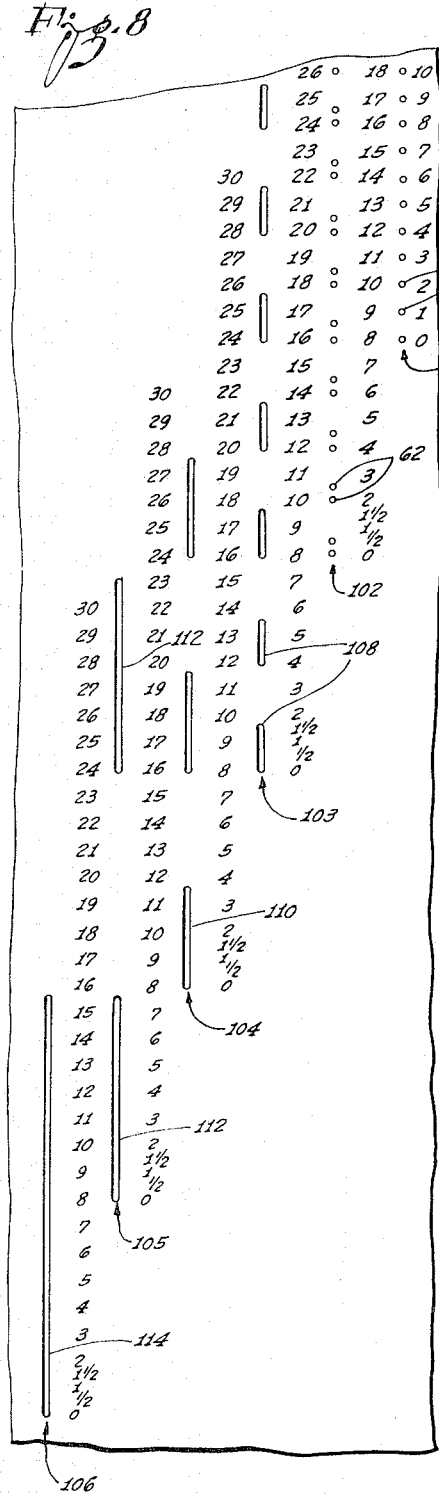
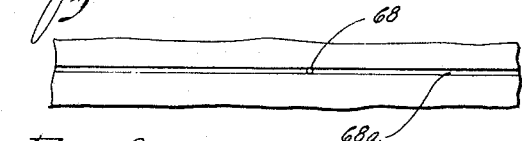
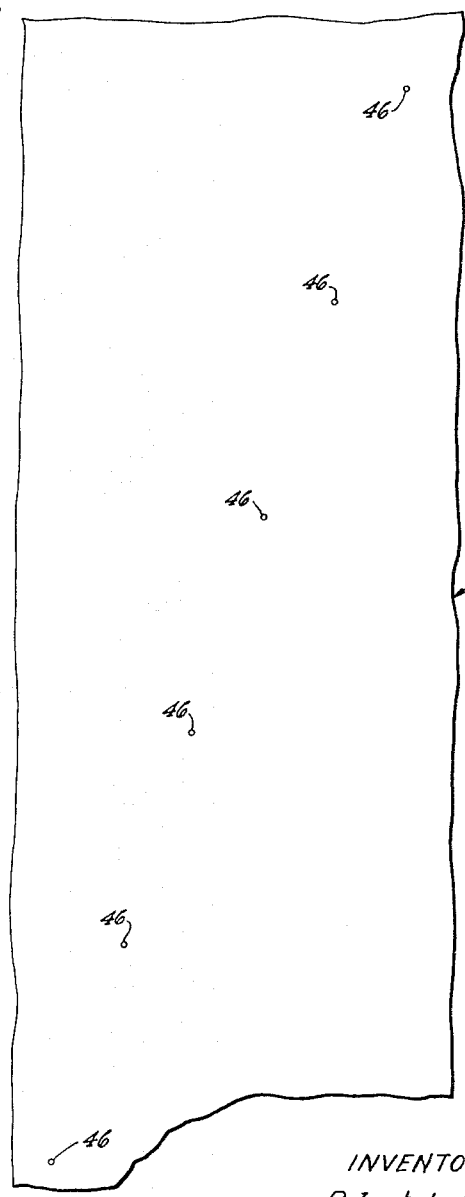

Patented Feb. 14, 1967

3,303,573
BINARY POSITION INDICATOR
Robert L. Alder, Pasadena, Calif., and Justin A. Varney,
7326 Oglesby Ave., Los Angeles, Calif. 90045
Filed Aug. 23, 1963, Ser. No. 304,084
11 Claims. (Cl. 33—205)

This invention relates to a detecting and signaling system for indicating increments of relative movement or the relative positions between two objects. While the basic concept is applicable to a wide range of purposes, the invention has special utility for transmitting the incremental data from a sending station to a remote receiving station along a stream of fluid flowing through a conduit between the two stations. Such a signaling system may be advantageous, for example, where the relative movement between two objects measures changes in a condition at the sending station. In the particular embodiment of the invention selected for the present disclosure, the signaling system is employed in a well bore to signal deviations of the bore from vertical during drilling operations. Obviously such an embodiment may be modified to cooperate with various sensing means to sense changes in various conditions such as changes in temperature, pressure, weight on the drill bit, etc.

A signaling system of this general character has been employed heretofore to create pressure signals in a stream of drilling fluid that flows down the drill stream in a well bore. For example, the Varney Patents 2,329,732, 2,435,934 and 2,762,132, which are hereby incorporated into the present disclosure by reference, disclose different versions of a signaling clinograph which employs a pendulum in cooperation with a graduated series of steps or stop shoulders. In such a device the freedom for relative movement between the pendulum and the series of stop shoulders is limited by engagement of the pendulum with a particular stop shoulder corresponding to the particular relative angle of the pendulum. The number of created signals depends upon the extent of relative movement, and thus the number of signals indicates the relative angle of the pendulum.

Such a signal system employs a choke head movable through a series of choke rings to create a series of pressure signals in the stream of drilling fluid. Since practical considerations make it desirable to limit the range of movement of the choke head to approximately six choke rings, the maximum number of angular measurements of the pendulum is limited to the same number of signals. The choice, then, is between measuring six increments that are sufficiently small for close control in a range of angles that is of inadequate width or, on the other hand, measuring a range of angles of satisfactory width in terms of increments that are too large for close control.

An object of the present invention as applied to such devices as a clinometer in an oil well is to avoid this dilemma and cover as wide a range of angles as may be desired in terms of increments as small as may be desired for close control.

The invention is based on the use of a given number of signals to represent a numerical system employing the given number of integers. Preferably, but not necessarily, a binary numerical system is employed. Thus a binary system in which six signals represent six bit channels can easily signal sixty different angle increments instead of being limited to the six increments of the described prior art arrangements. A clinometer capable of covering a range of angles of 30° in increments of one-half degree provides as fine measurements over as wide a range of angles as may be desired for close guidance in drilling well bores including well bores that are slanted to predetermined degree.

To carry out this basic concept, the invention, in effect, provides a transducer arrangement to convert changes in the relative distance between two objects into numbers in a numerical system. In a clinometer for use in an oil well, the two relatively movable objects are the pendulum and the set of graduated steps, the relative distance to be measured being determined by the relative angle of the pendulum.

The transducer means for a numerical system of a given number of integer channels represented by the given number of successive signals, includes two relatively movable overlapping code members connected to the two objects, respectively, and a sensing member or reading member or scanning member to traverse the two overlapping code members. The first code member has a series of code elements arranged in the given number of rows extending in the direction of relative movement between the two code members with the code elements of each row spaced in accord with the desired increments. The range of relative movement of the two code members is divided into the given number of divisions and the second code member has the given number of code elements in diagonal or skewed alignment spaced in accord with the divisions. Thus the code elements of the two code members coincide or register with each other to identify the individual increments in terms of the numerical system having the given number of integers.

The scanning member traverses the two overlapping code members and moves through the given number of signal stations. Preferably signals of two different amplitudes are employed when the scanning member reaches the different signal stations, one amplitude indicating one integer when two code elements coincide at a signal station, a signal of a different energy level being created when no code elements coincide in a signal station. For this purpose the choke head on approaching a choke ring either passes through the choke ring at a moderate rate to produce a pressure impulse of relatively high amplitude or is accelerated as it passes through the choke ring to produce a lower amplitude pressure pulse.

The effect of varying the rate at which the choke head passes through a choke ring may be understood when it is considered that there is some elasticity in drilling fluid under the high pressure conditions and a great deal of elasticity in the metal of the drill string. Because of the elasticity of the system the choking of the pumped stream of drilling fluid creates a pressure rise. If the choke head is moved quickly into a choke ring and held stationary, the pressure will arise steeply to a plateau. If the choke head is moved slowly into and through the choke ring the pressure will rise, perhaps as high as the plateau, and then will drop, the result being a pressure pulse of relatively high amplitude. On the other hand, if the choke head is moved rapidly through the choke ring, the time period is too short for the pressure to rise to maximum and the result is a relatively sharp pressure peak of relatively low amplitude.

In the selected practice of the invention disclosed herein for indicating deviations of a bore hole from vertical, the movable choke head is connected to a piston in a confined body of instrument liquid and the rate of movement of the choke head is governed by controlling the displacement flow of the liquid. The code elements in the two overlapping code members are apertures and the scanning member has a transverse aperture to traverse the code apertures of the two code members. The scanning member travels with the choke head and whenever the transverse aperture reaches a pair of registered code apertures in the two code members, bypass flow occurs through the three aligned apertures to accelerate the travel of the choke head.

The various features and advantages of the invention may be understood from the following detailed description and the accompanying drawings:

In the drawings, which are to be regarded as merely illustrative:

FIG. 5a is a broken longitudinal sectional view of a practical embodiment of the invention showing three consecutive upper portions of the signaling apparatus in a drill string;

FIG. 5b is a continuation of FIG. 5a showing two consecutive lower portions that complete the signaling apparatus in the drill string;

FIG. 6 is a fragmentary sectional view of a check valve employed in the apparatus;

FIG. 7 is a diagrammatic view, partly in section, showing how the two apertured code members and the apertured scanning member are related to the different positions of the choke head relative to the choke rings;

FIG. 8 is a developed view showing the pattern of six rows of code apertures in the first code tube;

FIG. 9 is a similar view showing the diagonal row of apertures in the second code tube; and FIG. 10 is a fragmentary developed view of the scanning member showing the transverse scanning aperture.

Figure 1:
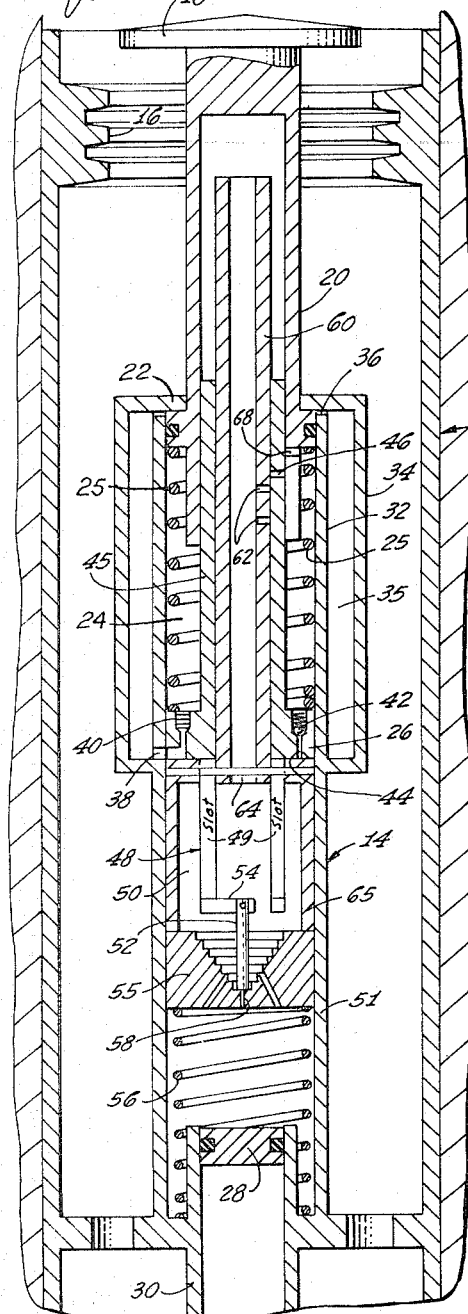
FIG. 1 is a simplified diagrammatic view representing one embodiment of the invention with the signaling plunger shown fully extended in preparation for downward movement to create a series of pressure signals.
Figure 2:
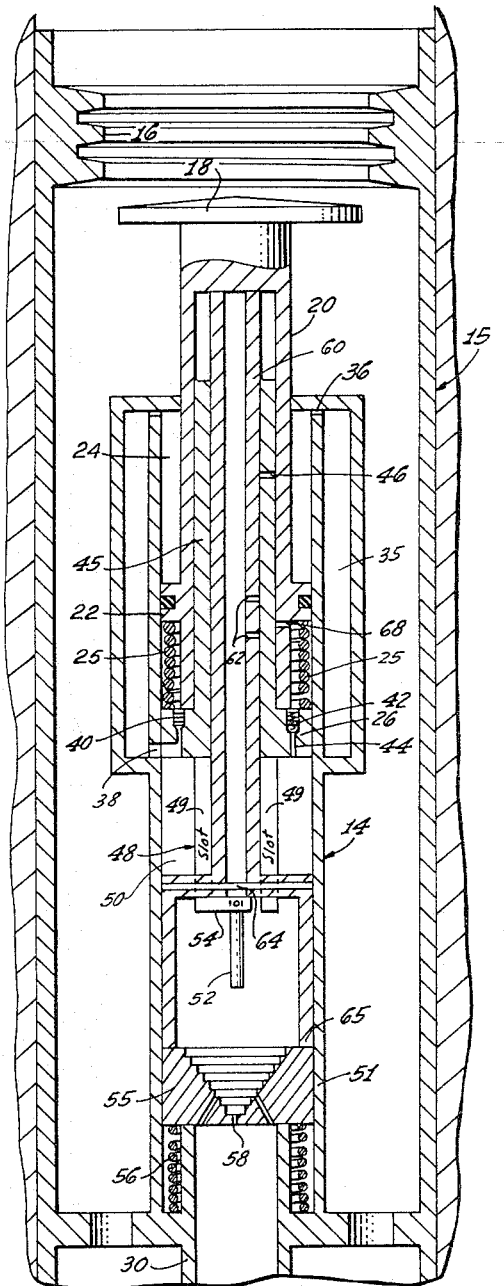
FIG. 2 is a similar view showing the signaling plunger fully retracted by the force of the stream of drilling fluid.

The invention may be understood by first considering FIGS. 1 and 2 which are simplified diagrams with dimensions distorted for clarity and for convenience of illustration. In this example, three consecutive pressure signals are used to designate numbers in a three-bit binary numerical system. Thus the three signals afford a total range of eight numbers indicating corresponding increments of relative movement or position of the coding members, which increments represent deviation of the borehole from vertical. One of the two contrasting bits of the binary system may be simply the absence of a pressure signal, but in this particular embodiment of the invention the two contrasting bits are pressure pulses of two different amplitudes created by moving a choke head through successive choke rings at two different rates. For example, the three consecutive pressure signals may be three low amplitude pulses designated by numeral 10 in FIG. 3. In another instance, another value may be designated by the three consecutive signals indicated in FIG. 4 in which the first two pressure pulses 10 are of relatively low amplitude and the third pressure pulse 12 is of substantially higher amplitude.

In FIGS. 1 and 2 an instrument case, generally designated 14, filled with an instrument fluid, such as a suitable oil, is mounted in a special sub 15 that is placed in the drill string close to the drill bit. The special sub 15 is provided with three equally spaced choke rings 16 for cooperation with a choke head 18 that is on the upper end of a tubular plunger 20. Inside the instrument case 14, the tubular plunger 20 is connected to an annular piston 22 in an annular control chamber 24 with a coil spring 25 acting in compression between the piston and the bottom wall 26 of the control chamber to urge the plunger upward.

Since extension and retraction of the plunger 20 causes displacement flow of the confined instrument fluid and since it is desirable to maintain the instrument fluid under the same pressure as the surrounding drilling fluid, the instrument case 14 is provided with a movable external wall such as a diaphragm or piston. In the construction shown, a floating piston 28 is mounted for this purpose in an open cylinder 30 at the lower end of the instrument case, the upper end of the cylinder being in communication with the confined instrument fluid and the lower end of the cylinder being in communication with the drilling fluid.

The annular control chamber 24 in which the annular piston 22 reciprocates is formed by a cylindrical wall 32 which is surrounded by an outer cylindrical wall 34 to form therewith an outer annular space 35 through which instrument fluid can flow from one end to the other of the control chamber 24 externally of the control chamber. The outer annular space 35 communicates with the upper end of the control chamber 24 through suitable ports 36 in the cylindrical wall 32 and communicates with the lower end of the control chamber 24 through a port 38 and a dashpot passage 40, which dashpot passage is provided with a series of restricted orifices (not shown) to retard the flow of the instrument fluid therethrough to a desirable degree. The lower wall 26 of the annular control chamber 24 is further provided with a check valve 42 in a passage 44. The check valve 42 opens to permit rapid extension or upward movement of the plunger 20, but closes in response to downward movement of the plunger to place the downward movement of the plunger under the control of the dashpot 40.

The concentric inner wall of the annular control chamber 24 is a fixed code tube 45 having suitable code apertures 46 therein. This fixed code tube 45 may be aptly termed a bypass code tube and the code apertures 46 may be aptly termed bypass apertures. A downward extension 48 of the bypass tube 45 into a lower chamber 50 serves as a fixed support for a pendulum 52 that is mounted by a universal joint 54. The pendulum 52 cooperates with a floating stop body 55 which is slidingly mounted in the chamber 50 and is continuously urged upward by a suitable coil spring 56, the rate of upward movement of the stop body being determined by the rate at which the instrument fluid can flow through a restricted axial metering orifice 58 of the stop body.

The extent to which the floating stop body 55 may be moved upward by the spring 56 is determined by the angle betwen the pendulum 52 and the longitudinal axis of the instrument case. If the pendulum coincides with the axis of the instrument case, the pendulum 52 engages the bottom step of the stop body as shown in FIG. 1. Since the three-bit binary number system provides a total of eight numerals, the floating stop body 55 has eight steps or stop shoulders as shown which divide the total range of adjustment of the stop body by the pendulum into eight increments.

Slidingly mounted inside the fixed bypass code tube 45 is a movable code tube 60 which is keyed against rotation and is provided with suitable code apertures 62. The code tube 60 is connected by a diametric pin 64 to a spacer cylinder 65 that is slidingly mounted in the lower chamber 50 between the floating stop body 55 and the bottom wall 26 of the upper annular chamber 24.

The tubular plunger 20 has an extension 66 below the annular piston 22 to serve as what may be termed a reading member or sensing member or scanning member for cooperation with the two code tubes 45 and 60 and which overlaps at all times all of the bypass apertures of the bypass code tube 45. For this purpose the scanning member 66 is provided with a narrow transverse scanning aperture 68.

Since there are three choke rings 16 to produce three successive pressure signals in the drilling fluid, there are three rows (not shown) of code apertures 62 spaced circumferentially apart in the inner movable code tube 60 and the fixed bypass code tube 45 has three code or bypass apertures 46 which are spaced apart longitudinally and are also spaced apart circumferentially to register with the three rows of apertures 62 of the inner bypass tube 60. The three staggered bypass code apertures 46 have the same longitudinal or axial spacing as the three choke rings 16. The lateral scanning aperture 68 of the scanning member 66 is of sufficient circumferential dimension to cooperate with the circumferentially spaced bypass apertures 46 of the bypass code tube 45.

The locations of the various apertures 68, 46 and 62 are such that as the choke head 18 reaches the level of each of the three choke rings 16 the transverse scanning aperture 68 coincides with one of the three bypass apertures 46. If the scanning aperture 68 and the bypass aperture 46 do not register with a code aperture 62 of the inner movable code tube 60, the choke head 18 moves downward through the choke ring at a relatively slow rate to have a relatively great restricting effect on the downwardly flowing drilling fluid and thereby cause a pressure pulse in the drilling fluid of relatively high amplitude. On the other hand, if the two apertures 68 and 46 register with a code aperture 62 of the inner movable code tube 60, a bypass is created from the annular chamber 24 to the lower chamber 50 through the interior of the inner code tube 60. When such a temporary bypass is created, the choke head 18 is accelerated past the choke ring to create a pressure signal of relatively low amplitude.

Figure 3:
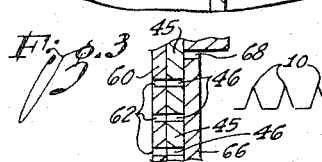
FIG. 3 is a diagrammatic view showing how the two apertured code members in cooperation with an apertured scanning member creates a series of three successive pressure pulses of relatively low amplitude indicating a particular number in the selected number system.
Figure 4:
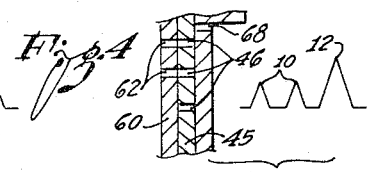
FIG. 4 is a similar view showing the parts arranged for producing a series of three successive pressure pulses in which the first two are of relatively low magnitude and the third pulse is of relatively large magnitude to indicate a different number.

To make clear the signaling action, the diagrammatic view, FIG. 3, shows the three bypass apertures 46 in a single longitudinal plane, whereas in fact the three are in different longitudinal planes. In FIG. 3 the three bypass apertures 46 happen to register with three code apertures 62 of the inner code tube 60. The scanning aperture 68 reaches each of the three pairs of registered apertures when the downwardly moving choke head 18 reaches each of the three choke rings 16. Because bypass flow occurs at each of these three points, the choke head is accelerated past the three choke rings to produce the three signals 10 of relatively low amplitude indicated in FIG. 3. In FIG. 4, however, only two bypass apertures 46 in the fixed bypass code tube 45 register with corresponding code apertures 62 in the inner code tube 60, the third bypass aperture 46 registering with a blank portion of the inner code tube. When the downwardly moving scanning aperture 68 passes the two bypass apertures 46, bypass flow occurs through the corresponding code apertures 62 to result in the two signals 10 of relatively low amplitude. When the scanning aperture 68 reaches the third and lowermost bypass aperture 46, however, no bypass flow occurs and consequently the choke head 18 moves rather slowly through the lower choke ring 16 to result in a third pressure signal 12 of relatively high amplitude.

During the drilling operation when the drilling fluid flows downward through the drill string at a relatively high velocity, the dynamic pressure or impact force of the drilling fluid against the upper side of the choke head 18 holds the choke head at its lower limit position shown in FIG. 2 in opposition to the forces exerted by the plunger spring 25 and the stop body spring 56. To obtain a reading of the inclination, if any, of the instrument case 14, the downward flow of the drilling fluid is stopped long enough to permit the spring 25 to extend the plunger 20 upwardly and to permit the srping 56 to lift the stop body 55. The check valve 42 opens to permit the plunger 20 to extend upward in a relatively rapid manner and the stop body 55 rises at a slower rate because of the retarded flow through the axial passage 58 of the stop body. The angle of the pendulum 52 relative to the axis of the instrument case determines which of the eight steps of the stop body 55 will be engaged by the pendulum and thereby determines the upper limit position of the stop body. Since the stop body acting on the spacer cylinder 65 moves the inner code tube 60 upward from the lower limit position shown in FIG. 2, the ultimate position of the inner code tube 60 relative to the adjacent bypass tube 45 is determined by the point at which the stop body 55 is stopped by the pendulum 52.

When the pumps at the top of the well are started to resume the downward flow of the drilling fluid, the choke head 18 is driven downward from the upper limit position shown in FIG. 1 at a controlled rate determined by the dashpot 40, fluid being expelled from the annular control chamber 24 through the dashpot into the outer annular space 35 to return to the top of the control chamber through the upper ports 36. The elevation of the inner code tube 60 determines which of the two binary bits is signaled by each of the three successive pressure pulses that occur as the choke head 18 passes each of the three successive choke rings 16. After the three pressure signals are sent to the top of the well through the stream of drilling fluid, the plunger 20 continues to descend and then contacts the upper end of the inner code tube 60 to drive the inner code tube and the stop body 55 to their lower limit positions shown in FIG. 2.

In a manner well known in the art, the pressure signals may be detected at the top of the well by a pressure-responsive device such as a conventional pressure gauge. If desired, the pressure signals may be recorded, for example, by means of a pressure responsive stylus in cooperation with a moving strip of paper.

A suitable construction for a commercial embodiment of the invention is shown in FIGS. 5a and 5b wherein parts corresponding to the parts shown in the diagrams of FIGS. 1 and 2 are indicated by corresponding numerals.

As shown in FIG. 5a, the special sub 15 encloses a removable liner 70 which provides six choke rings 16a, the liner being connected to the instrument case 14 by a ring 72 which is formed with longitudinal passages 74 for the free flow of drilling fluid therethrough. In the construction shown, the instrument case 14 includes an upper annular body 75 which embraces an upwardly extending tube 76 of the instrument case and the ring 72 which is bonded to the liner 70 is confined between the upper end of the annular body 75 and a snap ring 78 seated in a circumferential groove of the tube 76.

The annular body 75 is formed with a cylindrical skirt 80 with the previously mentioned cylindrical wall 34 embracing the skirt and with the skirt, in turn, embracing the inner cylindrical wall 32 that cooperates with the wall 34 to form the previously mentioned annular space 35 surrounding the annular control chamber 24.

As shown in the third section of FIG. 5a, the bottom wall 26 of the annular control chamber 24 is in the form of a heavy ring which is interlocked by snap rings with the bypass tube 45 and with the previously mentioned cylindrical wall 51 which extends downward to serve as the outer wall of the lower chamber 50.

The third section of FIG. 5a and the first section of FIG. 5b show how the bypass code tube 45 has the previously mentioned downward extension 48 which carries the pendulum 52. The previously mentioned universal joint 54 for suspending the pendulum 52 is shown in the form of gimbals. The first section of FIG. 5b also shows one of the previously mentioned slots 49 in the tubular extension 48 which clears the diametrical pin 64. The pin 64 which connects the inner code tube 60 with the previously mentioned spacer cylinder 65 also extends through a ring 82 and a short plastic cylinder 84, which plastic cylinder serves as a cage for the pendulum 52 when the plunger 20 is retracted to its lower limit position during normal drilling operation.

As shown in the second section of FIG. 5b, the lower end of the instrument case 14 is centered in the special sub 15 by an annular casting 85 which is provided with a plurality of passages 86 for the free flow of drilling fluid therethrough. The lower end of the cylindrical wall 51 of the instrument case is mounted on the outer circumference of the casting 85 and the previously mentioned open cylinder 30 which carries the floating piston 28 is mounted on the inner circumference of the casting, the two cylindrical members being connected to the casting by suitable screws 88.

As shown in the first section of FIG. 5b, the previously mentioned floating stop body 55 may comprise a stack of six rings 90 of stepped configuration with the stack mounted in a slidable sleeve 92 and confined in the sleeve between an upper snap ring 94 and a lower snap ring 95.

In this particular embodiment of the invention, the stack of stop rings 90 cooperates with the pendulum 52 to detect sixty increments of deviation from vertical. Accordingly, the stack of stop rings 90 provides a graduated series of sixty steps 96 to detect deviation from vertical over a range of 30° in increments of one-half degree. Accordingly, the lowermost stop ring 90, which has the previously mentioned axial metering orifice 58, is formed with an axial well 98 to receive the pendulum 52 when the instrument case is vertical and the lower stop ring further provides ten steps 96. The remaining five stop rings each have ten steps 96.

The developed view in FIG. 8 shows how the code tube 60 may be provided with six rows 101–106 of code apertures 62 for cooperation with the six choke rings 16a to indicate the half degree increments of deviation by sixty-one numbers in a six-bit binary numerical system. The code tube 60 has sixty-one longitudinally spaced stations at which the code apertures 62 may be located, the spacing of the stations being the vertical dimensions of the steps 96 of the six stop rings 90. Where a series of code apertures 62 occur at successive stations in the six rows, a single longitudinal slot may be used instead of the individual code apertures. Thus, in FIG. 8, the third row 103 of code apertures 62 includes a series of slots 108, each of which covers four stations; the fourth row 104 includes slots 110, each of which covers eight successive stations; the fifth row 105 includes longitudinal slots 112, each of which covers sixteen consecutive stations; and the sixth row 106 has a single slot 114 which extends over thirty-one consecutive stations.

The developed view of FIG. 9 shows how the bypass code tube 45 may be provided with six bypass code apertures 46 in alignment with the six rows of code apertures, respectively, of the code tube 60. The six bypass code apertures 46 are staggered longitudinally of the bypass tube, the longitudinal spacing of the bypass code apertures being the same as the center-to-center spacing of the six choke rings 16a, the spacing being equivalent to sixteen increments along the inner movable code tube 60.

The second section of FIG. 5a shows a scanning aperture 68 in the scanning member 66, which scanning member is the downward tubular extension 66 of the plunger 20. The scanning aperture 68 is located immediately below the annular piston 22. Since the plunger 20 is free to rotate the scanning aperture 68 must be effective around the whole circumference of the scanning member 66. For this purpose the scanning aperture 68 may be of the form shown in FIG. 10 where a single small aperture 68 communicates with an inner circumferential groove 68a of 360° extent. The circumferential scanning groove 68a reaches the level of each of the bypass code apertures 46 of the bypass code tube 45 when the choke head 18 reaches the choke ring 16a that corresponds to the bypass code aperture.

A certain problem arises in that the accelerating effect of bypass flow of the instrument fluid should extend over a substantially longer longitudinal distance than the relatively narrow scanning groove 68a. As shown in FIG. 7, this problem may be solved by providing a longitudinal groove 46a in the outer surface of the bypass code tube 45 in communication with each bypass code aperture 46, the longitudinal groove 46a being of sufficient length to cause the choke head 18 to accelerate as it approaches a choke ring 16a and to continue to move at a rapid rate until it is clear past the choke ring. It can be seen in FIG. 7 that a longitudinal groove 46a is of substantially greater longitudinal dimension than the corresponding choke ring 16a.

The manner in which the scanning aperture 68 and groove 68a in the scanning member 66 cooperate with the diagonal row of six bypass code apertures 46 in the bypass code tube 45 and the six longitudinal rows of the code apertures 62 in the code tube 60 may be understood from the aforegoing description. The particular pattern of code apertures 62 in the code tube 60 that is shown in FIG. 8, together with the particular pattern of bypass code apertures 46 in the bypass tube 45 shown in FIG. 9, results in a succession of six high amplitude signals when the deviation is zero because at that time none of the code apertures 62 registers with a bypass aperture 46 to permit bypass flow for accelerating the downward travel of the choke head 18. The peak pressure of the six high amplitude signals in the drilling fluid may be, for example, on the order of 300 p.s.i. above the background or normal flow pressure in the fluid stream. The pressure of the six low amplitude signal pulses may be, for example, 100 p.s.i. above normal flow pressure whereby the high and low amplitude signal pulses are readily distinguished from each other.

When the upward movement of the stop rings 90 by the spring 56 is stopped by the pendulum 52 at the first step of the lower stop ring as a result of one-half degree of deviation from vertical, the resulting signal is five high amplitude pressure pulses followed by a single low amplitude pressure pulse.

One degree of deviation results in four high amplitude signals, a low amplitude signal and a final high amplitude signal. One and one-half degrees of deviation is indicated by four high amplitude signals followed by two low amplitude signals and 2° of deviation is indicated by three high amplitude pressure pulses followed by a single low amplitude pressure pulse and then two high amplitude pulses. It is in this manner that the described instrument distinguishes sixty increments of deviation from vertical in terms of sixty different six-bit binary numerals.

Our description in specific detail of the selected embodiments of the invention will suggest various changes, substitutions and other departures from my disclosure within the spirit and scope of the appended claims. The code elements may take forms other than apertures. For example, the code elements may be conductor elements which close circuits by contact with each other.

We claim:

1. Means to indicate at a receiving station a condition existing at a sending station spaced from the receiving station along a conduit confining a stream of fluid, comprising:

a pair of overlapping relatively movable code members at the sending station;

means responsive to changes in said condition to create relative movement between the two code members to indicate changes in the condition;

two series of code elements on the two code members respectively, the code elements on one of the two code members being arranged in a given number of rows extending in the direction of relative movement, the code elements of the other code member being aligned with said rows respectively, the range of relative movement between the two code members being divided into increments with the code elements distributed accordingly for code elements of the two code members to coincide with each other to identify the increments in terms of a numerical system having a number of integers corresponding to the given number of rows;

scanning means at the sending station movable along the code members to sense coincidence of code elements of the two code members along said rows of code elements;

signal means at the sending station synchronized with said scanning means and capable of creating pressure signals in the fluid stream to travel along the stream to the receiving station, said signal means being responsive to said scanning to indicate coincidence of code elements;

and means to derive energy from the fluid stream to operate said scanning means and said signal means synchronously.

2. Means to indicate at a receiving station a condition existing at a sending station spaced from the receiving station along a conduit confining a stream of fluid, comprising:

a pair of overlapping relatively movable code members at the sending station;

means responsive to changes in said condition to create relative movement between the two code members to indicate the changes in the condition;

two series of code elements on the two code elements respectively, the code elements on one of the two code elements being arranged in rows of a given number extending in the direction of relative movement, the code elements of the other code member being aligned with said rows respectively, the range of relative movement between the two code members being divided into increments with the code elements distributed accordingly for code elements of the two code members to coincide with each other to identify the individual increments in terms of a numerical system having integers corresponding in number to said given number;

means at the sending station operative to choke the stream of fluid the given number of times in succession to create pressure signals to travel through the stream to the receiving station;

and means operative synchronously with the choking means to sense coincidence of the code elements of the code members and to modify the operation of the choking means accordingly to signal the coincidence of code elements of the two code members.

3. A mechanism for use in a signaling indicator in a stream of fluid in a conduit to indicate changes in a condition, wherein the indicator has a housing for positioning in the conduit, a plunger protruding from the housing for extension and retraction relative thereto to generate a given number of successive pressure signals at corresponding given positions of the plunger, the plunger being movable in one direction in response to force by the stream of fluid, and the indicator further has means to urge the plunger in the opposite direction in the absence of force by the stream of fluid, said mechanism including:

a pair of relatively movable overlapping code members, one of the code members having rows of code elements extending in the direction of relative movement with code elements of each row spaced in accord with the spacing of the given positions of the plunger, the number of rows corresponding to the given number of pressure signals, the other of the two code members having code elements corresponding in number to said given number and positioned to traverse the given number of rows, respectively;

means responsive to changes in said condition to vary the relative positions of the two code members through a range of relative positions to indicate the changes;

the range of relative movement between the code members being divided into increments with the code elements distributed accordingly for code elements of the two code members to coincide with each other to identify the individual increments in terms of a numerical system having integers corresponding in number to said given number;

and means synchronized with the plunger to sense coincidence of elements of the two code members and to respond to such coincidence by accelerating the plunger at the corresponding given positions of the plunger to modify the pressure signals produced at the given positions of the plunger.

4. Means to indicate at a receiving station a condition existing at a sending station spaced from the receiving station along a conduit confining a stream of fluid, comprising:

a first signal means at the sending station forming a portion of the channel of the fluid stream;

a second signal means movable along said portion of the channel;

a plurality of a given number of first choke means spaced apart on one of the two signal means longitudinally thereof;

second choke means on the other of the two signal means to cooperate with the first choke means to restrict the fluid stream to create a succession of pressure signals in the fluid stream corresponding in number to said given number in response to the movement of the second signal means, said second signal means being movable in one direction from a first position to a second position in response to the flowing of the fluid;

yielding means to return the second signal means from its second position to its first position whereby the second signal means reciprocates along the first signal means in response to stopping and starting of the fluid stream;

means at the sending station including a body of instrument fluid together with means coupled to the second signal means to displace the instrument fluid at a retarded rate from a high pressure region to a low pressure region whereby the retarded rate normally determines the character of the pressure signals;

a pair of overlapping relatively movable code members in the instrument fluid;

means responsive to changes in said condition to create relative movement between the two code members to indicate the changes;

two series of code elements in the form of code apertures in the two code members, respectively, the code elements on one of the two code members being arranged in rows corresponding in number to said given number and extending in the direction of relative movement, the code elements of the other code member being aligned with said rows, respectively, the range of relative movement between the two code members being divided into increments with the code elemnets distributed accordingly, for code elements of the two code members to coincide with each other to identfy the individual increments in terms of a numerical system having integers corresponding in number to the given number;

and an apertured sensing member in the instrument fluid coupled to the second signal means for movement thereby along the pair of overlapping code members to bypass the instrument fluid to the low pressure region through the pairs of coinciding code apertures thereby to momentarily increase the rate of movement of the second signal means to change the character of the pressure signals whereby the signal means produces two kinds of signal integers for said numerical system.

5. Means to indicate at a receiving station a condition existing at a sending station spaced from the receiving station along a conduit confining a stream of fluid, comprising:

a first signal means at the sending station forming a portion of the channel of the fluid stream;

a second signal means movable along said portion of the channel;

a plurality of a given number of first choke means spaced apart on one of the two signal means longitudinally thereof;

a second choke means on the other of the two signal means to cooperate with the first choke means to restrict the fluid stream to create a succession of pressure signals in the fluid stream corresponding in number to said given number of choke means in response to the movement of the second signaling means, said second signaling means being movable in one direction from a first position to a second position in response to the flowing of the fluid;

yielding means to return the second signal means from its second position to its first position whereby the second signal means reciprocates along the first signal means in response to stopping and starting of the fluid stream;

means at the sending station including a body of instrument fluid, together with means coupled to the second signal means to displace the instrument fluid at a retarded rate from a high pressure region to a low pressure region whereby the retarded rate normally determines the character of the pressure signals;

a pair of overlapping code members in said instrument liquid, one of said code members being fixed, the other code member being movable relative thereto from a first position to a second position in response to the fluid-actuated movement of the second signal means;

yielding means to return the movable code member to its first position;

means to measure said condition and to limit the return movement of the movable code member in accord with the measurement whereby the relative overlap of the two code members indicate the measurement;

code elements on the two code members, respectively, in the form of code apertures, the code elements on one of the two code members being arranged in rows extending in the direction of relative movement with the number of rows corresponding to said given number, the code elements of the other code member being aligned with said rows, respectively, the range of relative movement between the two code members being divided into increments with the code elements distributed accordingly for code elements of the two code members to coincide with each other to identify the individual increments in terms of a numerical system having the given number of integers;

and an apertured scanning member in the instrument fluid coupled to the second signal means for movement thereby along the pair of overlapping code members to bypass the instrument fluid to the low pressure region through the pairs of coinciding code apertures thereby to momentarily increase the rate of movement of the second signal means to change the character of the pressure signals whereby the signal means produces two kinds of signal integers for said numerical system.

6. Means to indicate at a receiving station a condition existing at a second station spaced from the receiving station along a conduit confining a stream of fluid, comprising:

means at the sending station capable of choking the stream of fluid a given number of times in succession to create the given number of pressure signals to travel through the stream to the receiving station;

means at the sending station including a confined body of instrument fluid together with means coupled to the choke means for operation thereby to displace the instrument fluid at a predetermined rate from a high pressure region to a low pressure region whereby the predetermined rate normally determines the character of the pressure signals;

a pair of overlapping relatively movable code members in the instrument fluid;

means responsive to changes in said condition to create relative movement between the two code members to indicate changes in the condition;

two series of code elements in the form of code apertures in the two code members, respectively, the code elements on one of the two code members being arranged in rows corresponding in number to said given number and extending in the direction of relative movement, the code elements of the other code member being aligned with said rows respectively, the range of relative movement between the two code members being divided into increments with the code elements distributed accordingly for code elements of the two code members to coincide with each other to identify the individual increments in terms of a numerical system having integers corresponding in number to said given number;

an apertured scanning member in the instrument fluid coupled to the signal means for movement thereby along the pair of overlapping code members to bypass the instrument fluid to the low pressure region through pairs of coinciding code apertures thereby to change the character of the pressure signals;

and means to derive energy from the stream to actuate said signal-creating means.

7. A combination as set forth in claim 6 in which said signal-creating means is operable in one respect by the dynamic pressure of the stream;

and which includes yielding means to operate the signal means in the opposite respect whereby the signal means may be operated in both respects by stopping and starting the fluid stream.

8. Means to indicate at a receiving station a condition existing at a sending station spaced from the receiving station along a conduit confining a stream of fluid, comprising:

a pair of overlapping relatively movable code members at the sending station;

means responsive to changes in said condition to create relative movement between the two code members to indicate changes in the condition;

an enclosure confining the two code members together with a body of instrument fluid;

means including a plunger to move along said fluid stream to create a succession of a given number of pressure signals, the character of which varies with the speed of movement of the plunger, said plunger variably extending from said enclosure to cause displacement flow of the enclosed instrument fluid whereby the rate of movement of the plunger is governed by the rate of displacement flow, said plunger being movable from a first position to a second position by the dynamic pressure of the fluid stream;

yielding means to return the plunger to its first position whereby the plunger may be reciprocated by stopping and starting the fluid stream;

a pair of overlapping relatively movable code members in the instrument fluid;

code elements on the two code members respectively, said code elements being in the form of apertures, the code elements on one of the two code members being arranged in said given number of rows extending in the direction of relative movement with the rows corresponding in number to said given number, the code elements of the other code member being aligned with said rows respectively, the range of relative movement between the two code members being divided into increments with the code elements distributed accordingly for code elements of the two code members to coincide with each other to identify the individual increments in terms of a numerical system having integers corresponding in number to said given number;

and an apertured scanning member in said enclosure coupled to the plunger and movable thereby along said pair of overlapping code members to bypass the displacement flow through the registered code apertures thereby to vary the rate of movement of the plunger to modify the pressure signals.

9. A combination as set forth in claim 8 which includes control means at the receiving station to start and stop the fluid stream thereby to cause the creation of signals at the sending station to indicate changes in the condition at the sending station.

10. Means to indicate at a receiving station at the top of an oil well changes in a condition at a remote sending station in the oil well, comprising:

a first signal means at the sending station forming a portion of the channel of the fluid stream;

a second signal means movable along said portion of the channel;

a plurality of a given number of first choke means spaced apart on one of the two signal means longitudinally thereof;

second choke means on the other of the two signal means to cooperate with the first choke means to restrict the fluid stream to create a succession of pressure signals in the fluid stream corresponding in number to said given number in response to the movement of the second signal means, said second signal means being movable in one direction from a first position to a second position in response to the flowing of the fluid;

yielding means to return the second signal means from its second position to its first position whereby the second signal means reciprocates along the first signal means in response to stopping and starting of the fluid stream;

means at the sending station including a body of instrument fluid together with means coupled to the second signal means to displace the instrument fluid at a retarded rate from a high pressure region to a low pressure region whereby the retarded rate normally determines the character of the pressure signals;

a pair of overlapping relatively movable code members in the instrument fluid;

means responsive to changes in said condition to create relative movement between the two code members to indicate the changes;

code apertures in the two code members respectively to coincide at different relative positions of the two code members;

and an apertured sensing member in the instrument fluid operatively related to the second signal means to move simultaneously therewith along the pair of overlapping code members to bypass the instrument fluid to the low pressure region through the coinciding code apertures of the two code members at fluid-restricting positions of the second signal means whereby such coincidence accelerates the second signal means to produce signals distinct from the signals produced when the signal signals means is not accelerated, said code apertures being distributed to create different sequences of the distinctive signals over the range of movement of the second signal means to indicate different relative positions of the two overlapping code members.

11. A method of indicating at a receiving station a condition existing at a sending station spaced from the receiving station along a conduit confining a stream of fluid, characterized by the steps of:

moving a first choke means relative to a second choke means at the sending station to restrict the flow of the fluid in the conduit at a succession of relative positions of the two choke means to produce a succession of pressure signals in the stream of fluid;

displacing instrument fluid at the sending station from a high pressure region to a low pressure region in response to the relative movement between the two signal means whereby the rate of movement of the first choke means at the successive relative positions varies with the rate of flow of the instrument fluid from the high pressure region to the low pressure region; and bypassing the instrument fluid from the high pressure region to the low pressure region at positions selected among said succession of relative positions thereby to accelerate the rate of movement of the first choke means to produce distinctive pressure signals at the selected positions, the selection being made in accord with changes in said condition whereby different sequences of the distinctive signals indicate different states of the condition.

References Cited by the Examiner

UNITED STATES PATENTS

| | | | |
|---|---|---|---|
| 2,329,732 | 9/1943 | Varney et al. | 33—205 |
| 2,435,934 | 2/1948 | Varney et al. | 33—205 |
| 2,747,797 | 5/1956 | Beaumont | 250—208 |
| 2,955,283 | 10/1960 | Bush-Keiser | 340—203 X |
| 2,966,673 | 12/1960 | Guernsey | 340—347 |
| 3,030,617 | 4/1962 | Chase | 340—347 |
| 3,057,974 | 10/1962 | Cohen | 235—201 |

LEONARD FORMAN, *Primary Examiner.*

LOUIS R. PRINCE, *Examiner.*

C. C. ELLS, W. K. QUARLES, *Assistant Examiners.*